W. Morstatt,
Boring Wood.
No. 104,337.  Patented June 14, 1870.
Figure I.
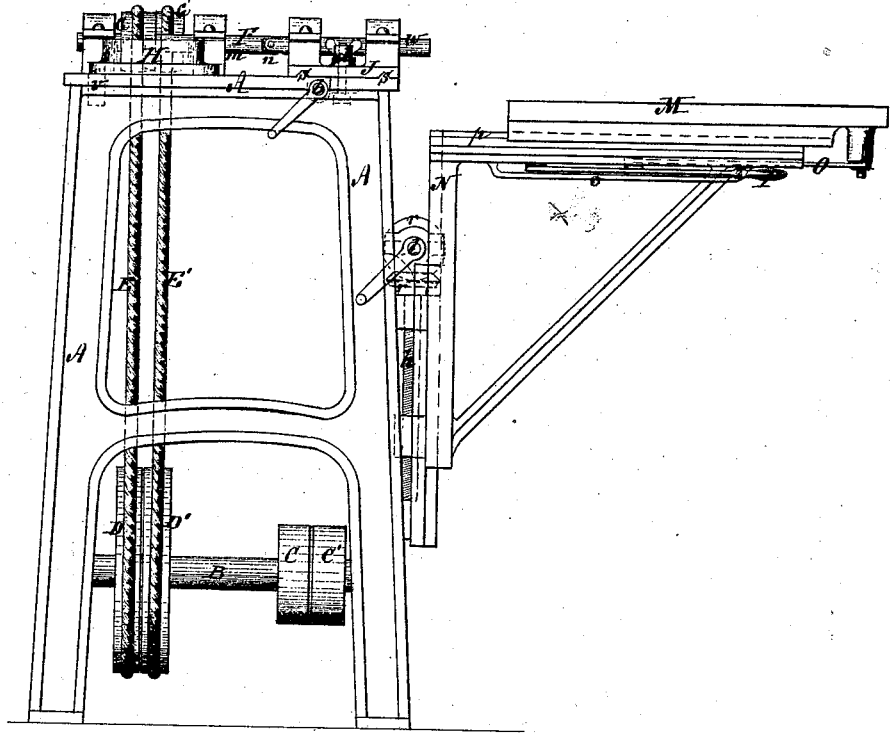
Figure II.
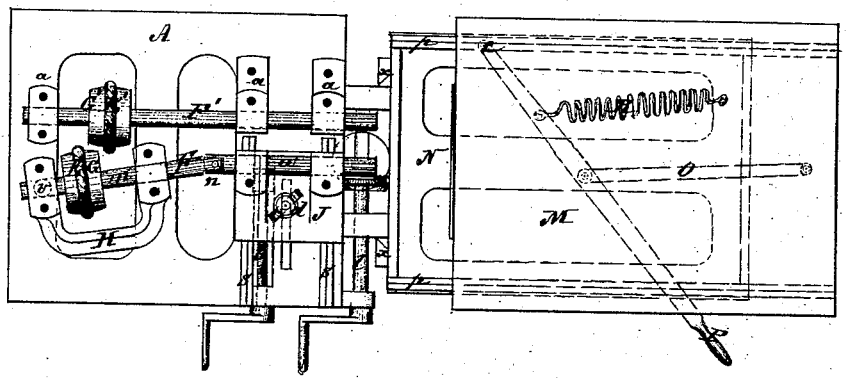
Witnesses  
Henry E. Roeder  
John Christ
Inventor  
William Morstatt

United States Patent Office.

WILLIAM MORSTATT, OF NEW YORK, N. Y.

Letters Patent No. 104,337, dated June 14, 1870.

IMPROVEMENT IN BORING-MACHINE.

The Schedule referred to in these Letters Patent and making part of the same.

*To all whom it may concern:*

Be it known that I, WILLIAM MORSTATT, of New York, in the county and State of New York, have invented a new and improved Boring-Machine; of which the following is a specification.

This invention relates to the arrangement and combination of two spindles, to which the desired boring-tools are attached, in such a manner that one of said spindles shall be capable of being moved farther away or nearer to the other spindle, for the purpose of boring at the same time two holes any desired distance apart.

Figure I represents a side elevation of a machine embodying my invention.

Figure II is a plan of the same.

In the accompanying drawing—

A is the frame of the machine.

B is the main shaft, provided with the usual pulleys, C C', and with two pulleys, D D', from which latter motion is communicated by means of belts or cords E E', to the two boring spindles, F F'.

The spindle F' is supported in suitable bearings, $a$ $a$ $a$, firmly attached to the top plate of the frame, and is provided with a suitable pulley, G' connected, through the belt or cord E', with the pulley D', from which it receives its desired motion.

The spindle F is made in two parts, $m$ and $w$, connected together by the universal joint $n$.

The after part $m$ of this spindle is supported in a framing, H, arranged with suitable bearings, turning upon a center pin, $v$, below its after bearing, fitting into the top plate of the framing A.

This after part, $m$, of the spindle F is provided with a suitable pulley, G, and connected, through the belt or cord E, with the pulley D, from which it receives its desired motion, and which, through the universal joint $n$, is communicated to the forward part $w$ of said spindle.

The forward part $w$ of the spindle F runs in suitable bearings attached to a sliding-block, J, moving on ways, $s$ $s$, provided on the top plate of the frame A, in such a manner that this forward part $w$ of the spindle F will always be parallel with the stationary spindle F'.

The sliding block J is operated through the screw $b$, and securely fixed at any desired position by means of the bolt $d$, in the same manner as a support on a turning lathe. The forward ends of these spindles are arranged in the usual manner, to receive the boring tools.

By this arrangement, the forward part, $w$, of the spindle F can be moved any distance from the stationary spindle F', for the purpose of boring two holes at the same time, and at any desired distance apart, the after part $m$ of said spindle F accommodating itself to any position, by the turning of its bearing frame H around its pin $v$, and will, through the universal joint $n$, communicate the required motion to said forward part in any position the same may be moved or fixed.

The operation of moving or changing the position of this forward part of the spindle F may be done while the machine is in motion.

Against the front part of the framing A, a frame, N, is fitted, sliding in suitable grooves, $x$, capable of moving upward and downward.

This frame N is connected with an upright screw, $h$, operated from a shaft, $l$, through gearing, $r$ $r$, for the purpose of moving this frame N upward or downward, as may be desired.

Instead of this upright screw, a pinion may be arranged on the shaft $l$, working into a suitable rack attached to the frame N.

Upon the top of this frame N a table, M, is fitted, moving on suitable ways, $p$, on this frame N, and operated through the lever P, centered at $e$ to the framing N, and connected, through the rod O, with this table M.

A spring R, attached to the end of the frame N and to this lever P, holds this table M near the end of the frame N away from the boring tools, except when counteracted through the lever P.

The material to be bored is fixed upon this table M, and the frame N, together with the table M, moved in the required position, through the screw $h$, so as to bring the place where the holes are to be bored in a line with the boring tools, when the material is pressed against the tools by the operation of the lever P, moving the table M, as above described.

What I claim as my invention, and desire to secure by Letters Patent, is—

1. The arrangement, on the side of the fixed or stationary spindle F', of a spindle F, consisting of two parts, $m$ and $w$, connected by a universal joint, $n$, and supported in movable bearings or frames, substantially in the manner and for the purpose described.

2. The sliding-block J, supporting the forward part $w$ of the spindle F, and the frame H, turning on a center-pin, $v$, supporting the after part $m$ of said spindle, arranged and operating in the manner substantially as and for the purpose hereinbefore set forth.

3. In combination with the above, the sliding frame N, with its table M, constructed, arranged, and operating in the manner and for the purpose substantially as specified.

WILLIAM MORSTATT.

Witnesses:
 HENRY E. ROEDER,
 JOHN CHIRST.